US011074716B2

(12) United States Patent
Lopich et al.

(10) Patent No.: US 11,074,716 B2
(45) Date of Patent: Jul. 27, 2021

(54) IMAGE PROCESSING FOR OBJECT DETECTION

(71) Applicant: Apical Limited, Cambridge (GB)

(72) Inventors: Alexey Lopich, Cambridge (GB); Anton Kachatkou, Cambridge (GB)

(73) Assignee: Apical Limited, Cambridge (GB)

( * ) Notice: Subject to any disclaimer, the term of this patent is extended or adjusted under 35 U.S.C. 154(b) by 189 days.

(21) Appl. No.: 16/400,726

(22) Filed: May 1, 2019

(65) Prior Publication Data
US 2019/0340785 A1    Nov. 7, 2019

(30) Foreign Application Priority Data

May 4, 2018    (GB) ...................................... 1807406

(51) Int. Cl.
| | |
|---|---|
| *G06K 9/00* | (2006.01) |
| *G06T 7/73* | (2017.01) |
| *G06T 7/246* | (2017.01) |
| *G06T 3/40* | (2006.01) |
| *G06T 5/50* | (2006.01) |
| *G06T 5/40* | (2006.01) |

(52) U.S. Cl.
CPC ............... *G06T 7/74* (2017.01); *G06T 3/40* (2013.01); *G06T 5/40* (2013.01); *G06T 5/50* (2013.01); *G06T 7/248* (2017.01)

(58) Field of Classification Search
CPC ... G06T 2207/10016; G06T 7/73; G06T 7/20; G06T 7/74; G06T 7/248; G06T 3/40; G06T 5/50; G06T 5/40; G06K 9/4604; G06K 9/00744; G06K 9/4642
USPC .......................................... 382/103; 345/633
See application file for complete search history.

(56) References Cited

U.S. PATENT DOCUMENTS

2015/0029222 A1*   1/2015   Hofmann ............. G06K 9/6202
                                                      345/633

* cited by examiner

*Primary Examiner* — Charlotte M Baker
(74) *Attorney, Agent, or Firm* — EIP US LLP (57) ABSTRACT

A method of image processing in a computing device comprising an object detection system. The method comprises processing a first image frame, a second image frame, and one or more further image frames, the second image frame having been captured subsequent to the first image frame and the one or more further image frames having been captured subsequent to the second image frame. A feature extraction operation is performed on the first image frame and the second image frame. An object detection operation is performed, using feature data from said feature extraction operation, to produce object detection data. At least one parameter of said feature extraction operation, for processing said one or more further image frames, is modified in response to a characteristic of said object detection data.

17 Claims, 5 Drawing Sheets

IMAGE PROCESSING FOR OBJECT DETECTION

CROSS-REFERENCE TO RELATED APPLICATIONS

This application claims the benefit under 35 U.S.C. § 119(a) and 37 CFR § 1.55 to United Kingdom patent application no. GB1807406.2, filed on May 4, 2018, the entire content of which is incorporated herein by reference.

BACKGROUND OF THE INVENTION

Field of the Invention

The present disclosure relates to methods and apparatus for processing image data representative of image frames.

Description of the Related Technology

Methods to process image data, for example to detect characteristics of an image such as features or objects in the image, may be computationally intensive. There is thus a need for more efficient methods of detecting characteristics of images.

SUMMARY

In a first embodiment, there is provided a method of image processing in a computing device comprising an object detection system, the method comprising processing:
 a first image frame;
 a second image frame; and
 one or more further image frames,
 the second image frame having been captured subsequent to the first image frame and the one or more further image frames having been captured subsequent to the second image frame, and wherein the method comprises:
  performing a feature extraction operation on the first image frame and the second image frame;
  performing an object detection operation to produce object detection data, said object detection operation using feature data from said feature extraction operation; and
  modifying at least one parameter of said feature extraction operation for processing said one or more further image frames, in response to a characteristic of said object detection data.

In a second embodiment, there is provided an image processing system comprising:
 at least one processor configured to implement an object detection system; and
 storage accessible by the at least one processor, the storage configured to store:
  a first image frame;
  a second image frame; and
  one or more further image frames,
  the second image frame being captured subsequent to the first image frame and the one or more further image frames being captured subsequent to the second image frame;
 wherein the object detection system is configured to:
  perform a feature extraction operation on the first image frame and the second image frame;
  perform an object detection operation to produce object detection data, said object detection operation using feature data from said feature extraction operation;
 wherein the image processing system comprises a controller configured to:
  modify at least one parameter of said feature extraction operation for processing said one or more further image frames, in response to a characteristic of said object detection data.

Further features and advantages of the disclosure will become apparent from the following description of preferred embodiments of the disclosure, given by way of example only, which is made with reference to the accompanying drawings.

DETAILED DESCRIPTION OF CERTAIN INVENTIVE EMBODIMENTS

Details of systems and methods according to examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Figure 1:
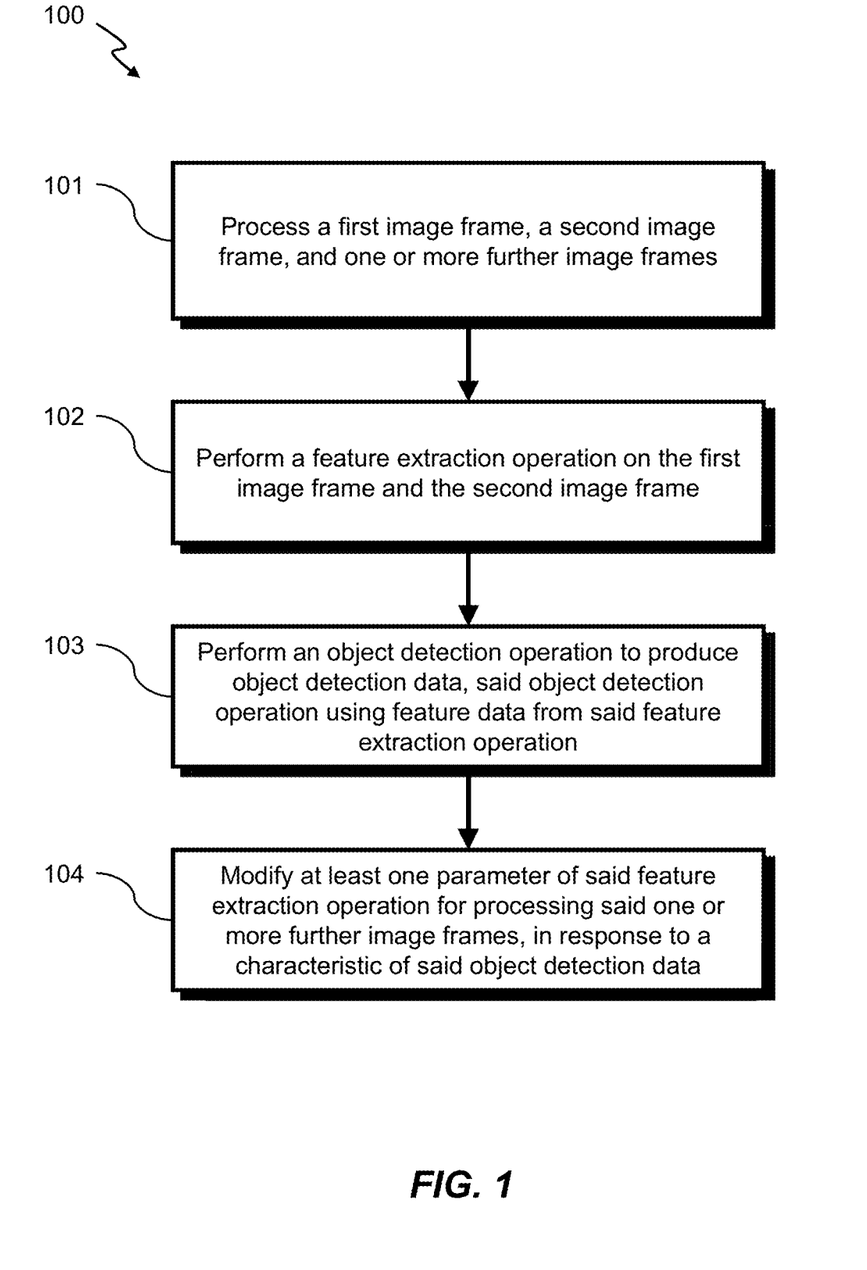
FIG. 1 shows schematically a method of image processing, in a computing device comprising an object detection system, according to examples.

FIG. 1 shows schematically a method 100 of image processing, in a computing device comprising an object detection system, according to an embodiment. An object detection system for example allows objects belonging to a particular class of objects to be detected in an image. For example, where the class is human faces, the object detection system may be used to detect the presence of a human face in the image. The object detection system may additionally or alternatively perform object identification, for example allowing instances of the object to be identified. As an example case, the instance may be a particular human face. Thus, the object detection system may be used to identify that a detected human face is the particular human face the object detection system is arranged to identify.

The method 100 comprises, at block 101, processing a first image frame, a second image frame, and one or more further image frames. A given image frame may comprise a frame of image data. For example, the processing of a given image frame may involve processing image data representing the given image frame. The first, second, and one or more further image frames may each represent a captured image of an environment. The image frames are thus captured in a temporal order: the second image frame having been captured subsequent to the first image frame; and the one or more further image frames having been captured subsequent to the second image frame. For example, the first and second image frames may comprise frames n and n+k (where n and k are positive integers) in a stream of sequential image frames that are processed. In some cases, k=1 such that the first and second image frames are consecutive. In other cases, k>1 such that the first and second image frames are not consecutive. In addition, the method 100 may be performed in a repeating periodic sequence of frames, or aperiodically, in response to events other than receipt of a new input frame by the object detection system.

The method 100 includes, at block 102, performing a feature extraction operation on two or more image frames, for example including the first image frame and the second image frame. The feature extraction operation may process the first and second image frames, e.g. taking respective image data corresponding thereto as input data, and produce feature data therefrom. The feature data may comprise derived values, e.g. "features", determined based on the input image data. The feature extraction operation may thus involve extracting particular features from the input data to generate the feature data comprising one or more derived features. In examples, the feature data may comprise one or more "feature vectors", "feature maps", or "feature descriptors". In examples, the feature data produced as part of the feature extraction operation includes one or more histogram-of-oriented-gradients (HOG) descriptors, the generation of which is described in more detail below. In other examples, the feature data includes one or more Haar (or "Haar-like") features, local binary patterns (LBP), scale-invariant feature transform (SIFT) features, gradient location and orientation histogram (GLOH) features and/or other feature types.

The method 100 also includes, at block 103, performing an object detection operation to produce object detection data. The object detection operation uses feature data from the feature extraction operation performed at block 102. For example, the feature data respectively corresponding to the first and second image frames is processed to determine whether an object of a particular class, or a specific object, is present in the first and second image frames respectively. An object detector may be implemented to perform the object detection operation at block 103. For example, a classifier may be used to process the feature data and determine whether an object of a particular class, or a specific object, is present. The classifier may map the feature data, taken as input data, to a class or category of objects. Examples of a classifier to perform the object detection operation include a support vector machine (SVM), a relevance vector machine (RVM), a neural network (NN), a Bayes classifier, and a k-nearest neighbours (k-NN) classifier. A neural network may be implemented to perform at least part of the feature extraction operation and/or the object detection operation in some examples.

The method 100 involves, at block 104, modifying at least one parameter of said feature extraction operation for processing said one or more further image frames, in response to a characteristic of said object detection data. Other inputs may also be used, in addition to the characteristic. In this example, the characteristic of the object detection data output from the object detection operation triggers the feature extraction operation to adapt when processing subsequent image frames.

The method 100 can thus be implemented to dynamically adapt system resource (e.g. power, memory, and/or processing) consumption of an object detection system arranged to perform the feature extraction and/or object detection operation(s). For example, modifying at least one parameter of the feature extraction operation in response to a given characteristic of said object detection data may allow a balance between (i) a precision or accuracy of feature extraction and object detection operations performable on image frames, and (ii) a resource consumption associated therewith, to be tuned based on information derived from object detection data determined using previously processed image frames.

In examples, the characteristic of said object detection data comprises an indication of an object being detected in the second image frame, which object having not been detected in the first image frame. For example, the object detection data may indicate that a particular object, e.g. belonging to a predetermined class of objects, which was determined to be absent in the first image frame, has appeared in the second image frame.

In other examples, the characteristic of said object detection data comprises an indication of an object not being detected in the second image frame, which object having been detected in the first image frame. In this case, the object detection data may indicate that a particular object detected in the first image frame has disappeared in the second image frame.

In examples, the image frames may be captured on a remote device, e.g. a mobile computing device which is able to move around the environment. Thus, the remote device may change a field-of-view (FOV) of the environment which the remote device is able to capture. As the FOV changes, new objects may appear in the field-of-view and thus appear in a corresponding stream of image frames captured by the remote device, those objects having been absent in image frames prior to the said stream of frames. Similarly, objects previously in the FOV of the remote device may fall out of the FOV and thus disappear from the captured image frames being processed.

In certain cases, an object may enter or leave the FOV of a device configured to capture the first, second, and one or more further image frames due to movement of the object in the environment. As an example, the configured device may comprise a security camera in a fixed location. The security camera may have a given FOV of the environment from its fixed location. New objects, e.g. people or vehicles, may enter the FOV of the camera and similarly objects may leave the FOV of the camera. Thus, objects may appear in, or disappear from, the second image frame relative to the first image frame captured prior thereto. In particular cases, an object may enter or leave the FOV of the device due to a combination of movement of the device and movement of the object.

In some examples, the characteristic of said object detection data comprises an indication that an object, detected in the first and second image frames, has accelerated relative to an environment represented in the first and second image frames.

For example, the object may be detected in a set of captured image frames, including the first and second image frames, and its position tracked relative to the environment over the set of frames. For example a position, or pose, of the detected object may be determined, e.g. relative to a given coordinate system, based on each of the set of captured image frames. A determined change in the position or pose of the detected object over the set of frames may indicate that the detected object is accelerating relative to the environment, e.g. relative to the given coordinate system. For example, the acceleration of the object may be determined based on the change in the position or pose of the object over the set of frames and time differences between subsequent captured image frames in the set. The indication that the object has accelerated over the set of frames may thus trigger the modifying of the at least one parameter of the feature extraction operation for processing further image frames, e.g. captured subsequent to the set of captured image frames. In examples, the indication that the object has accelerated over the set of frames is based on a determined acceleration value, e.g. an average acceleration value, having a predetermined relationship with a predetermined threshold acceleration value. For example, the indication may be based on the determined acceleration value being greater than the predetermined threshold acceleration value.

In other examples, the characteristic of said object detection data comprises an indication that the object detected in the first and second image frames has decelerated relative to the environment. Similarly to the case relating to acceleration of the object above, the determined change in the position or pose of the detected object over the set of frames may indicate that the detected object is decelerating relative to the environment, e.g. relative to the given coordinate system. The indication that the object has decelerated over the set of frames may thus trigger the modifying of the at least one parameter of the feature extraction operation for processing further image frames. In examples, the indication that the object has decelerated over the set of frames is based on a determined deceleration value, e.g. an average deceleration value, having a predetermined relationship with a predetermined threshold deceleration value. For example, the indication may be based on the determined deceleration value being greater than the predetermined threshold deceleration value.

In some examples, the characteristic of the object detection data comprises an indication that a change in the position or size of the object detected in the first and second image frames, relative to the environment, has a predetermined relationship with a predetermined threshold. For example, the object detection data may indicate that the object has changed in its position relative to the environment, e.g. a fixed coordinate system, by more than the predetermined threshold. The predetermined relationship between the positional change of the object and the predetermined threshold may comprise the positional change of the object being less than, less than or equal to, equal to, greater than or equal to, or greater than the predetermined threshold.

In some examples, the characteristic of the object detection data comprises an indication that an object detected in the first and second frames has been continuously detected in a plurality of frames, the plurality of frames including the first and second frames and having been captured prior to the further one or more frames. For example the characteristic may comprise an indication that the object has been detected in a number of successively processed frames, including the first and second frames, with the number exceeding a predetermined threshold.

In some examples, the characteristic of the object detection data comprises an indication that an object, detected in at least one of the first and second frames, has been detected in a predetermined portion of the respective image frame. In some cases, the characteristic comprises an indication that the detected object has been detected as being located in a predetermined region of the environment represented in the respective image frame.

Figure 2:
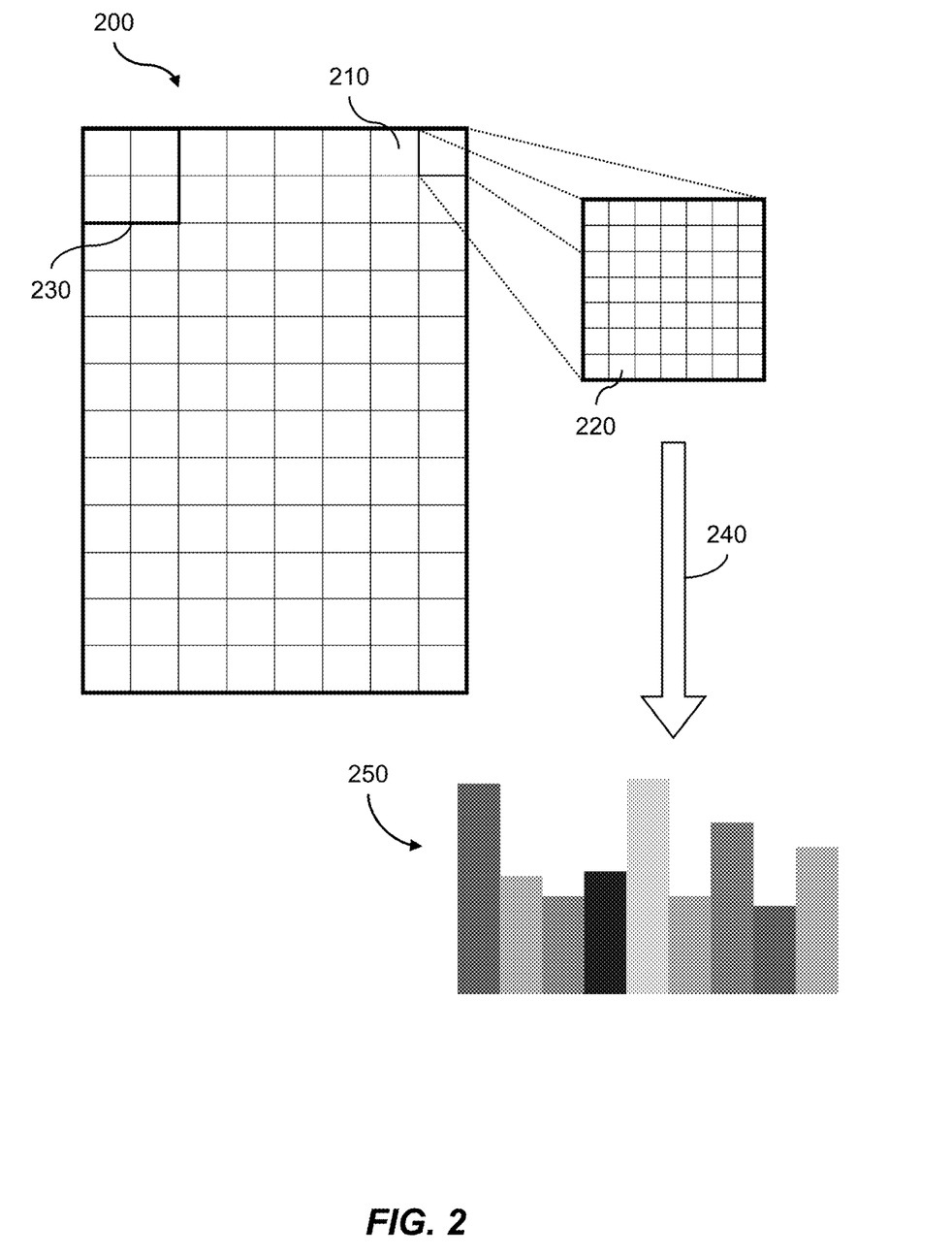
FIG. 2 shows schematically an example of generating histogram of oriented gradients (HOG) features from an image frame.

FIG. 2 shows schematically an example of generating HOG features as part of the feature extraction operation. An input image frame 200, e.g. the first or second image frame described above, is divided into a grid of portions (or "cells") 210. This grid may be predefined, such that each frame can be said to be divided into the same grid. For example, the cells 210 may have dimensions of 7×7 elements (or "pixels") 220 as shown in FIG. 2. In other examples, the cells may have different dimensions of pixels 220.

During processing 240 to determine a histogram of gradients 250 for each cell 210, gradients are determined at each pixel 220 of each cell 210. The gradients at each cell 210 may be determined by filtering the image frame, e.g. using one or more kernels, and determining a magnitude and a direction of each gradient at each pixel 220 using the filtered pixel values. The one or more filter kernels (or "gradient filters") may comprise $[-1, 0, 1]$ and/or $[-1, 0, 1]^T$ filter kernels. In other examples, the one or more filter kernels used may be different, e.g. a more complex kernel could be used.

The histogram 250 for a given cell 210 may be determined by binning the determined gradients at each pixel 220 of the given cell 210 into a number of bins or channels. For example, the histogram bins may be evenly distributed over 0 to 180 degrees or 0 to 360 degrees depending on whether the gradients are "signed", in other words whether the determined gradients specify a direction along its orientation, e.g. positive or negative. As an example, the histogram bins may comprise nine bins spread evenly over a 0 to 180 degrees range such that each bin corresponds to a 20 degree subrange. The gradients corresponding to the pixels 220 of the given cell 210 may then be distributed, as weighted votes, into the number of histogram bins. The votes may be weighted based on the determined gradient magnitudes of the pixels. The distribution of weighted votes of all pixels 220 in the given cell 210 may thus form the histogram 250 for the given cell 210.

In examples, the histograms 250 of each cell 210 may be locally normalised in local groups (or "blocks") 230 of cells 210. The example of FIG. 2 shows a block 230 having dimensions of 2×2 cells. The block 230 may have different dimensions in other examples. In this example, the block 230 is a rectangular ("R-HOG") block having a rectangular geometry. In other examples the block geometry may be different, e.g. each block 230 may comprise a circular ("C-HOG") block. The blocks 230 may overlap in examples, such that each cell 210 may contribute a plurality of times to the final HOG descriptor. The block normalisation may involve applying a normalisation factor such as L1-norm, L1-sqrt, L2-norm or L2-hys.

The HOG descriptor corresponding to the input image frame 200 may be determined based on a concatenation of the components of the normalized histograms for each cell 210 from each block 230. In examples, the feature data corresponding to a given image frame, determined during the feature extraction operation performed on the given image frame, includes one or more HOG descriptors.

In such examples, and returning to block 104 of the method 100 above, the at least one parameter of the feature extraction operation modified in response to a characteristic of said object detection data may include an offset between the image frame 200 and the grid of cells 210. For example, instead of the grid of cells 210 being oriented based on an x, y pixel coordinate (0, 0) of the image frame 200, the grid may be offset by a number of pixels in the x and/or y axes.

In certain cases, modifying the offset comprises modifying a number of different offsets, e.g. selecting a set of different offsets, between the given image frame and the plurality of cells for which the feature extraction operation is performed. For example, in one scheme, the feature extraction operation may use an offset of zero between the first and second image frames 200 and the grid of cells 210, and no other offsets. In response to the characteristic of the object detection data, however, the feature extraction operation may modify the offset and switch to another scheme in which a plurality of offsets between the one or more further frames 200 and the grid of cells 210 are used to process the one or more further frames.

In examples, the at least one modified feature extraction parameter comprises a relative scale (or "scale ratio") between the given image frame 200 and the dimensions of the cells 210 (or "cell size"). For example, in response to the characteristic of the object detection data, the cell size and/or the frame size may be modified when processing the one or more further image frames. The image frame may be rescaled, e.g. downscaled, by a scale factor such that a given cell size has a different area coverage of the rescaled image frame. The cell size may additionally or alternatively be modified to give the same effect. In some examples, the image frame may be cropped to reduce the size of the image frame, e.g. additionally or alternatively to rescaling the image frame. Such cropping of the image frame, in response to the characteristic of the object detection data, may reduce an amount of data to be processed during the feature extraction operation when performed on the one or more further image frames.

In certain cases, modifying the relative scale comprises modifying a number of different relative scales, e.g. selecting a set of different relative scales, between the given image frame and the plurality of cells for which the feature extraction operation is performed. For example, in one scheme, the feature extraction operation may process the first and second image frames 200 using a number of different scales of the image frames 200 and/or the cells 210. In response to the characteristic of the object detection data, however, the feature extraction operation may switch to another scheme wherein a different number of scales of the image frames and/or the cells 210 are used to process the one or more further frames. For example, the characteristic of the object detection data may comprise an indication that a particular object, e.g. belonging to a 'dog' object class, has been detected in the second image frame at a given relative scale between the second image frame and the implemented cell size, the dog having not been detected in the first image frame. In response, further relative scales may be used to detect the object class 'dog' in the one or more further image frames. For example, the dog may have been detected using a cell size of 8×8 pixels, and additional cell sizes of 7×7 and 9×9 pixels, e.g. from a predetermined set of cell sizes, may be used to detect the object class 'dog' in the one or more further image frames. As a further example, a human face may be detected in the second image frame at a relative scale between the second image frame and the implemented cell size of k. In response, relative scales of k−1 and k+1 between the second image frame and the implemented cell size may be enabled for processing the one or more further image frames, to detect objects in the human face class. This process may be iterative, with further relative scales being enabled or disabled in response to the characteristic of the object detection data at each iteration. For example, a subset of the relative scales that are enabled, e.g. for which the feature extraction operation is performed, may be modified in a graduated way relative to a predetermined superset of possible relative scales.

In some examples, the method 100 includes modifying a resolution of an object detection model in response to the characteristic of the object detection data. As described above, an object detector, e.g. classifier, may be implemented to perform object detection. The object detector may process the feature data using an object model to determine whether an object of the class, or a specific object, corresponding to the object model is present. For example, the object detector may access one or more object detection (or "classification") models for use in the object detection process to identify and/or classify objects in a particular class. The object models may exist in a high-dimensional feature space. The resolution of an object detection model may correspond to a portion size of a plurality of cells wherein the cells are processed using the object detection model in portions having the portion size during the object detection operation.

Figure 3:
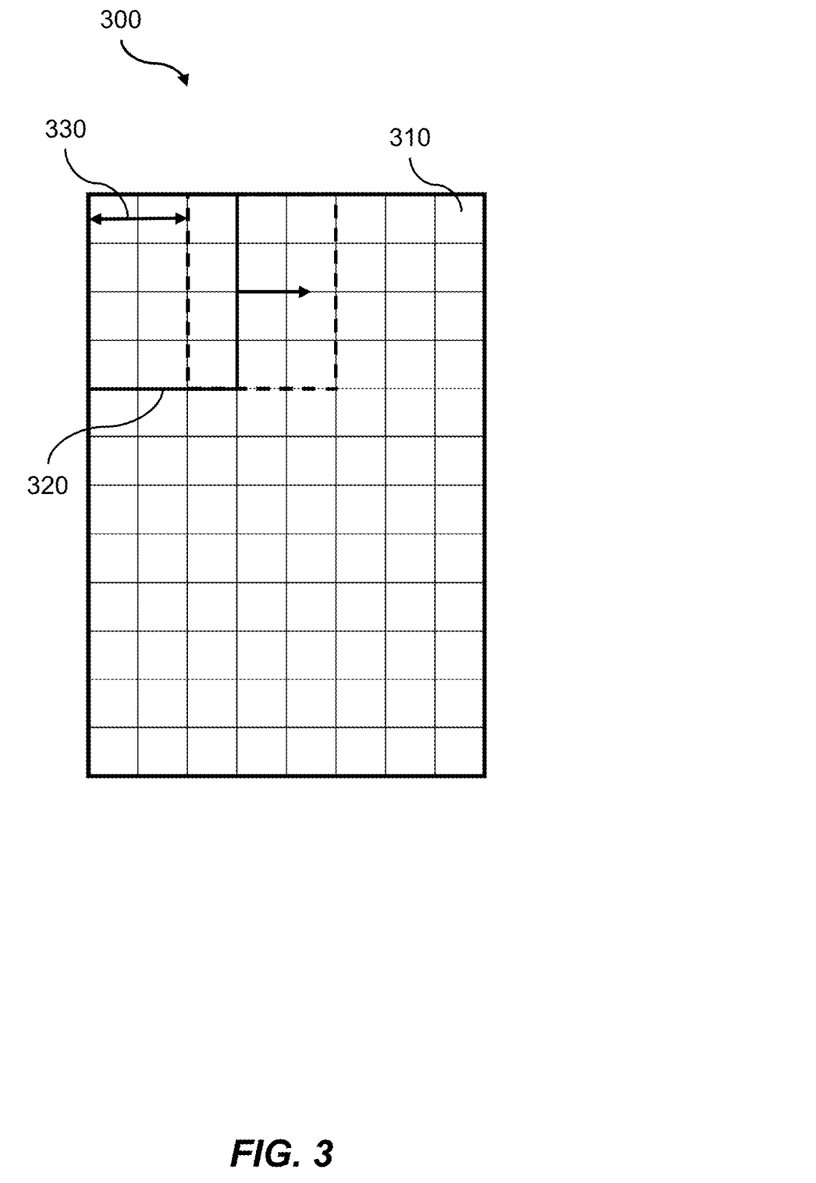
FIG. 3 illustrates a method according to an example.

For example, referring to the example image frame 300 shown in FIG. 3, the object detection may be performed for a plurality of cells 310 in a detection window 320 of a predetermined size relative to the image frame 300. For example, the detection window may have a predetermined size of 4×3 cells. The detection window 320 may be scanned over the feature space derived from the image frame 300, as shown by the directional arrow and dashed detection window in FIG. 3, with the object detection operation, e.g. using a classifier, being performed at each successive detection window 320 position. The successive positions of the detection window 320 may be separated by a predetermined step size (or "stride") 330, e.g. in units of pixels or cells. For example, the stride between the successive positions of the detection window 320 shown in FIG. 3 is two cells 310 in the horizontal direction. In examples, the stride between successive positions of the detection window 320, as it is scanned over the feature space derived from the image frame 300, may be modified in response to the characteristic of the object detection data. For example, the stride may be increased or decreased based on the characteristic.

A given object detection model may be trained for a given predetermined size of the detection window 320, and may thus be said to have a resolution corresponding to the given detection window size. In some examples, in response to the characteristic of the object detection data, a different resolution of the object detection model may be used to process the one or more further image frames compared to the resolution of the object detection model used to process the first and second image frames. In examples, modifying the resolution of the object detection model may include selecting a different model, having a different resolution, for the same class of object. For example, a 'face' model for detecting human faces in images, and having a resolution of 9×11 cells, may have been used to perform the object detection operation on the first and second image frames. A corresponding 'face' model but having a resolution of 5×7 cells may be selected to perform the object detection operation on the one or more further image frames, in response to the characteristic of the object detection data.

In certain cases, the resolution of an object detection model is modified in accordance with the modifying of the relative scale between the given image frame and the cell size. For example, in response to the characteristic of the object detection data, the relative scale between the given image frame and the cell size may be decreased (e.g. to detect features at smaller scales) and the resolution of the object detection model may be increased accordingly, such that the one or more further image features are processed using a smaller relative scale between the given image frame and the cell size, and a higher resolution of the object detection model. As an alternative example, the relative scale between the given image frame and the cell size may be increased (e.g. to detect features at larger scales) and the resolution of the object detection model may be decreased accordingly, in response to the characteristic of the object detection data.

In examples, object detection models, which may be referred to herein as "object models" or simply "models", may be grouped. For example, a set of models usable in the object detection operation may include a hierarchy of models for a given object class. The hierarchy may include a dominant model for the given object class, and one or more subordinate models. For example, a hierarchy of models corresponding to a 'human face' class of objects may include a dominant model corresponding to a frontal orientation of the human face, and one or more subordinate models corresponding to other orientations of the human face, e.g. side profiles and/or tilted orientations.

In certain cases, the dominant and subordinate models of the hierarchy may be enabled, e.g. usable as part of the object detection operation, during processing of the first and second image frames. In response to the characteristic of the object detection data, one or more of the subordinate models may be disabled for processing the further image frames. For example, the hierarchy of models may be associated with different profiles of a 'car' class of objects. The dominant model may correspond with a frontal profile of a car, with the subordinate models corresponding to different side profiles and orientations of the car. The characteristic of the object detection data may indicate, e.g. that a car detected in the first and second image frames has remained substantially static, thus triggering disablement of subordinate models in the hierarchy of models corresponding to the 'car' class, e.g. left- and right-hand side profiles, for processing the one or more further image frames captured subsequent to the first and second image frames. In some examples the hierarchy of models corresponding to a given class of objects may include more than two levels, such that the enablement and/or disablement of models may be graduated according to the hierarchy levels. For example, a first level of models corresponding to the given object class may be enabled first, followed by a second level of models, and then a third level of models. The models may be disabled in reverse order according to the hierarchy, e.g. third then second then first.

Object detection models may additionally or alternatively be linked to other object detection models. For example, models may be associated with one another according to a structure, e.g. a network, which sets out the relationships between the different models. Thus, in examples, enabling more object detection models for processing the further image frames includes enabling linked models according to the structure. As an example, the characteristic of the object detection data may indicate that an object belonging to a 'human face' class of objects has moved in its position between the first and second image frames, and in response an additional model associated with the 'human face' model may be enabled, e.g. a 'human upper body' model. The enabling of the models may be implemented according to the structure. Similarly, models may be disabled in response to the characteristic of the object detection data. For example, a set of object models relating to people detection may have been enabled during processing of the first and second image frames, e.g. including 'human face', 'human upper body' and 'human lower body' object models. In response to the characteristic of the object detection data, e.g. an indication that a 'human upper body' object detected in the first frame has not been detected in the second frame, the related 'human lower body' object model may be disabled for processing the further image frames, e.g. in addition to disabling the 'human upper body' object model.

In examples, the structure associating models with one another may additionally specify relative scales between models that are associated. For example, the 'human face' and 'human upper body' models described above may be associated with each other and have a specified relative scale, e.g. scale factor C. Thus, for example, the 'human upper body' model may be enabled on scale M based on the 'human face' being enabled on scale N wherein the ratio of the scales M and N is related to the scale factor C specified by the structure for those associated models.

In examples, method 100 includes modifying at least one parameter of the object detection operation for processing said one or more further image frames, the modifying being in response to a characteristic of said object detection data. The modifying the at least one parameter of the object detection operation may include selecting a set of object detection models implementable as part of said object detection operation, for processing said one or more further image frames, in examples. For example, certain models may be enabled or disabled, as described above, in response to characteristic of said object detection data.

In some cases, selecting the set of object detection models implementable as part of said object detection operation includes selecting which object detection models of a plurality of object detection models are implementable based on links between one or more of the plurality of object detection models. As described above, the models may be linked with one another via a structure or network, and the selection of the models may be done according to the said structure or network.

In examples, the at least one parameter of said feature extraction operation that is modified in response to the characteristic of the object detection data comprises an update rate, corresponding to a rate at which subsequent image frames are processed by the feature extraction operation. For example, the feature extraction operation may process the captured first and second image frames at a given update rate of n frames per second (fps), e.g. 10 fps. In response to the characteristic of the object detection data, the given update rate may be modified by a factor, e.g. increased to 2n fps or decreased to n/4 fps, for processing the one or more further image frames. The update rate of the feature extraction operation may be updated independently from a capture rate of the image frames, e.g. a rate at which the image frames are captured and enter the image processing pipeline. For example, the image frames may be captured at a predetermined capture rate, e.g. 60 fps, which may be a parameter associated with a sensor used to capture the image frames. Upon the update rate of the feature extraction operation being modified in response to the characteristic of the object detection data, e.g. from n fps to n/2 fps, the capture rate may remain unchanged or may be modified independently from the update rate.

In examples, the at least one parameter of said feature extraction operation is modified to change, in response to the characteristic of the object detection data, an operational precision of the object detection system for processing said one or more further image frames. For example, the characteristic of said object detection data may comprise an indication that an object has been detected in the second image frame, which object was not detected in the first image frame, and in response to said characteristic the operational precision of the object detection system may be increased. Increasing the operational precision of the object detection system may involve one or more of: increasing the resolution of an object model; increasing the number of different object models implemented; decreasing the relative scale between the image frame and the cells; increasing the number of different relative scales between the image frame and the cells; decreasing the stride of the detection window scanning; and increasing the update rate; as described in examples above. The operational precision of the object detection system may additionally or alternatively be increased in response to the characteristic of said object detection data indicating that an object, detected in the first and second image frames, has accelerated relative to an environment represented in the first and second image frames, e.g. a fixed coordinate system, as described in examples above.

In other examples, the operational precision of the object detection system may be decreased for processing the one or more further image frames, in response to the characteristic of the object detection data. Decreasing the operational precision of the object detection system may involve one or more of: decreasing the resolution of an object model; decreasing the number of different object models implemented; increasing the relative scale between the image frame and the cells; decreasing the number of different relative scales between the image frame and the cells; increasing the stride of the detection window scanning; and decreasing the update rate; as described in examples above.

For example, the characteristic of said object detection data may comprise an indication that an object which was detected in the first image frame has not been detected in the second image frame, and in response to said characteristic the operational precision of the object detection system may be decreased. The operational precision of the object detection system may additionally or alternatively be decreased in response to the characteristic of said object detection data indicating that an object, detected in the first and second image frames, has decelerated relative to an environment represented in the first and second image frames, e.g. a fixed coordinate system, as described in examples above. In examples, the characteristic of said object detection data may indicate that an object has remained substantially static in the first and second image frames (e.g. has changed in its position relative to the environment by less than a predetermined threshold) and in response, the operational precision of the object detection system is decreased.

In examples, modifying an operational precision of the object detection system for processing said one or more further image frames comprises modifying an operational precision of the feature extraction operation for said processing. As an example, the feature extraction operation performed on the first and second image frames may include applying a number N of kernels which cover an angle range, e.g. 180 or 360 degrees. Each kernel may have a given geometry, e.g. u×v cells or pixels. A given object model may be proportional to the given geometry of the kernel and/or a number of kernels applied. In some examples, a given object model may additionally or alternatively be proportional to the number of bins into which values associated with the pixels of a cell are grouped into, e.g. the number of bins as described above with reference to the HOG descriptor examples.

Thus, in response to the characteristic of the object detection data, the operational precision of the feature extraction operation, for processing said one or more further image frames, may be modified by modifying the number of bins, the kernel geometry, and/or the number of kernels used therein. In some examples, the resulting features (e.g. feature vectors, feature maps, descriptors), represented by the feature data, and the given model may scale proportionally. In examples, the operational precision of the feature extraction operation may be reduced, e.g. by using fewer bins and/or a smaller kernel size, in response to the characteristic of the object detection data. Such reduction in the operational precision of the feature extraction operation may reduce an accuracy of the object detection operation, e.g. cause a higher rate of false-positives detected by the object detection system. However, in response to a further characteristic of further object detection data—for example determined based on processing of a further image frame of the one or more further image frames—the operational precision of the feature extraction operation may be increased again to increase the accuracy of the object detection operation, e.g. reducing the rate of false-positives detected by the object detection system. For example, more bins and/or a larger kernel size may be used to increase the operational precision of the feature extraction operation.

Figure 4:
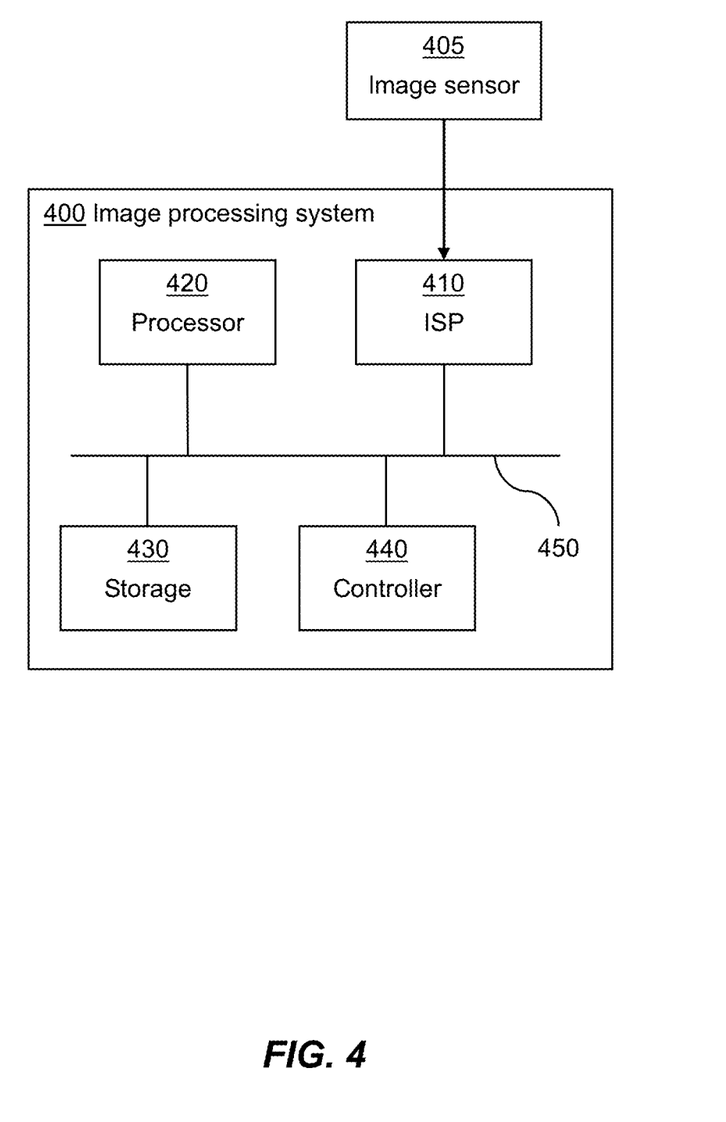
FIG. 4 shows schematically an example image processing system for use with the methods described herein.

An example of an image processing system 400 for use with the methods described herein, such as the method of FIG. 1, is shown schematically in FIG. 4. The image processing system 400 of FIG. 4 may be coupled to or form part of a computer device, such as a personal computer, a laptop, a smartphone or an on-board computer device which may be coupled to or mounted within an apparatus such as a camera or a vehicle.

The image processing system 400 may be coupled to, or include, an image sensor 405. An image sensor typically includes an array of sensor pixels, which may be any suitable photosensors for capturing images. For example, a typical sensor pixel includes a photosensitive element such as a photodiode that can convert incident light into electronic signals or data. The sensor pixel may for example be a charge-coupled device (CCD) or a complementary metal-oxide-semiconductor (CMOS). The image sensor 405 in this example is arranged to capture image data representative of an image frame. The image frame may form part of a video, which is typically a series of image frames captured sequentially. For example, the image frame may correspond to a frame of a video.

The image data may represent at least one characteristic of the light captured by the image sensor 405, such as an intensity of the light captured by each sensor pixel, which may be proportional to the number of photons captured by that sensor pixel. The intensity may represent a luminance of the captured light, which is for example a measure of the intensity of light per unit area rather than an absolute intensity. In other examples, the image data may be representative of a brightness of captured light, which may be considered to correspond to a perception of a luminance, which may or may not be proportional to the luminance. In general, the image data may represent any photometric quantity or characteristic that may be used to represent the visual appearance of the image represented by the image data, or may be derived from any such photometric quantity or characteristic. The image data may be in any suitable format, such as a raw image format. For example, the image data may be streamed from the image sensor 405, with or without being saved to a framebuffer, without saving the raw image data to memory. In such cases, image data obtained after processing of the raw image data may, however, be written to memory.

In FIG. 4, the image sensor 405 is arranged to transfer image data to an image signal processor (ISP) 410 of the image processing system 400. The transfer of the image data to the ISP 410 may occur via a camera serial interface (CSI). The ISP 410 may perform initial processing (or "pre-processing") of the image data to prepare the image data for display. For example, the ISP 410 may perform saturation correction, renormalization, white balance adjustment and/or demosaicing, during pre-processing.

The image processing system 400 of FIG. 4 includes at least one processor 420 configured to implement an object detection system. The at least one processor 420 may include a central processor unit (CPU) for example. In other examples, the image processing system 400 may include additional or alternative processors such as a microprocessor, a general purpose processor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions of the object detection system described herein. The image processing system 400 may also or alternatively include a processor implemented as a combination of computing devices, e.g., a combination of a DSP and a microprocessor, a plurality of microprocessors, one or more microprocessors in conjunction with a DSP core, or any other such configuration. The image processing system 400 may also or alternatively include at least one graphics processing unit (GPU).

The image processing system 400 of FIG. 4 also includes storage 430 accessible by the at least one processor 420. In examples, the image processing system 400 may include a dynamic memory controller (DMC) which may be used to control access to the storage 430. The storage 430 may be a random access memory (RAM) such as DDR-SDRAM (double data rate synchronous dynamic random access memory). In other examples, the storage 430 may be or include a non-volatile memory such as Read Only Memory (ROM) or a solid state drive (SSD) such as Flash memory. The storage 430 in examples may include further storage devices, for example magnetic, optical or tape media, compact disc (CD), digital versatile disc (DVD) or other data storage media. The storage 430 may be removable or non-removable from the image processing system 400. The storage 430 is for example configured to store image data representative of a first image frame, a second image frame, and one or more further image frames, which may be received from the ISP 410. The second image frame may be captured subsequent to the first image frame, and the one or more further image frames may be captured subsequent to the second image frame, e.g. by the image sensor 405.

Figure 5:
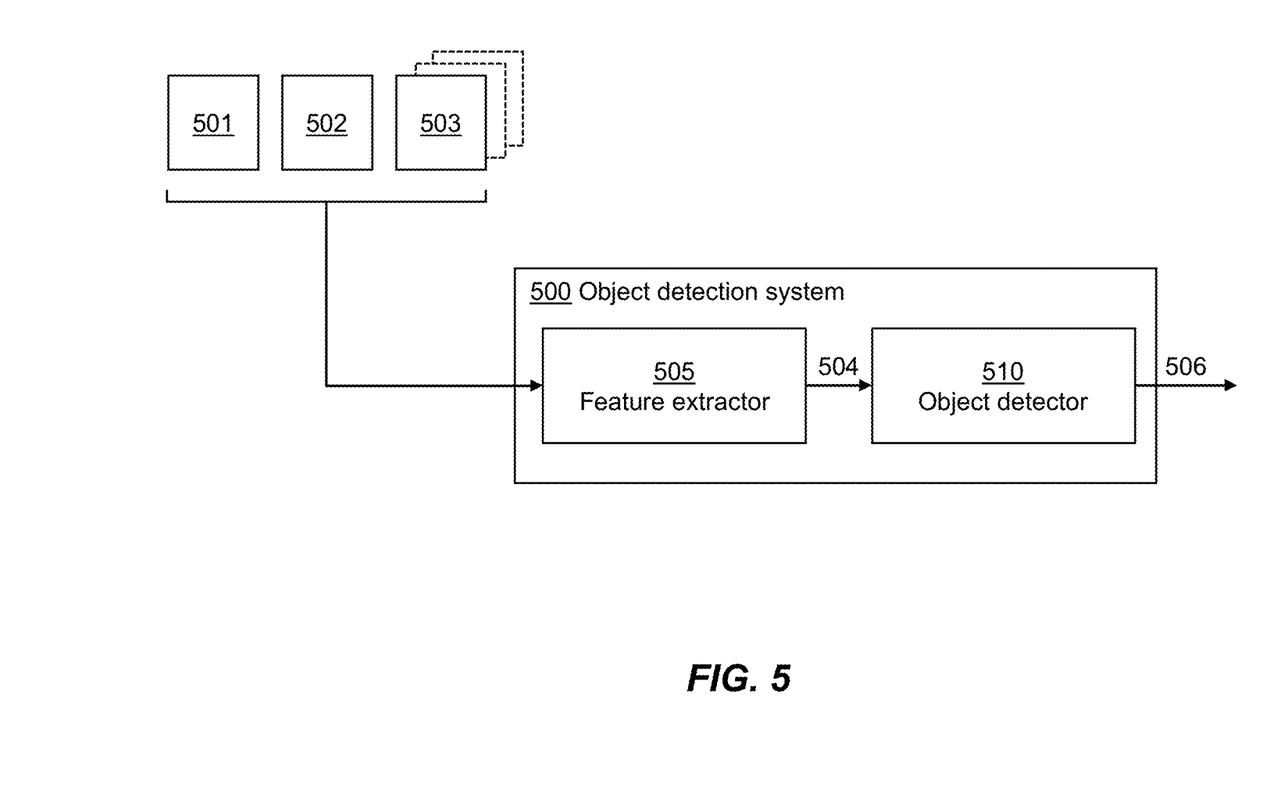
FIG. 5 shows schematically an example object detection system for use with the methods described herein.

FIG. 5 shows an example of an object detection system 500, e.g. which may be implemented by the at least one processor 420 of the image processing system 400 of FIG. 4. The object detection system 500 is configured to perform a feature extraction operation on the first image frame 501 and the second image frame 502. For example, the object detection system 500 may obtain the first and second image frames 501, 502 from the image sensor 405, the ISP 410 or the storage 430. The object detection system 500 of FIG. 5 includes a feature extractor 505 to perform the feature extraction operation. The feature extractor 505 may be configured to determine feature data 504 corresponding to a given input image frame. For example, the feature data 504 may comprise one or more histogram of oriented gradients (HOG) descriptors as described in the example methods above.

The object detection system 500 is also configured to perform an object detection operation to produce object detection data, said object detection operation using the feature data 504 from the feature extraction operation. The object detection system 500 of FIG. 5 includes an object detector 510 to perform the object detection operation. The object detector 510 may be configured to determine object detection data 506 based on the feature data 504. In examples, the object detector 510 comprises a support vector machine (SVM) configured to perform the object detection operation. In other examples, the object detector 510 may comprise a relevance vector machine (RVM), a neural network (NN), a Bayes classifier, or a k-nearest neighbours (k-NN) classifier.

Returning to the example image processing system 400 of FIG. 4, a controller 440 is included as part of the image processing system 400. The controller 440 is configured to modify at least one parameter of the feature extraction operation, e.g. implemented by the feature extractor 505, for processing the one or more further image frames 503, captured subsequently to the first and second image frames 501, 502, in response to a characteristic of the object detection data 506. Example characteristics of the object detection data 506 output by the object detector 510 are described in the methods above. Similarly, examples of the parameter modifications to the feature extraction operation for processing the one or more further image frames 503 are also described above.

In examples, the storage 430 is configured to store a plurality of object detection models. The object detection models may be stored in the same, or a different, storage component as the image data. Each of the plurality of object detection models is configured to use feature data 504 derived from a given image frame 501, 502, 503 to detect whether a predetermined object class or instance is present in the given image frame. The object detection system 500 may be configured to use a subset of the plurality of object detection models to perform the object detection operation using the feature data 504. In some examples, the subset includes all of the object detection models in the plurality of object detection models. The controller 440 may be configured to, in response to the characteristic of said object detection data, modify a number of the object detection models in the subset for processing said one or more further image frames 503. For example, the controller 440 may instruct a different number of object detection models to be used by the object detector 510 when performing the object detection operation on the feature data 504 corresponding to the one or more further image frames 503. As described above, the controller 440 may increase the number of models to be used by the object detector 510 to increase the operational precision of the object detection system 500 when processing the one or more further image frames 503. Alternatively, the controller 440 may decrease the number of models to be used by the object detector 510 to decrease the operational precision of the object detection system 500 when processing the one or more further image frames 503.

The components of the image processing system 400 in the example of FIG. 4 are interconnected using a systems bus 450. This allows data to be transferred between the various components. The bus 450 may be or include any suitable interface or bus. For example, an ARM® Advanced Microcontroller Bus Architecture (AMBA®) interface, such as the Advanced eXtensible Interface (AXI), may be used.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A method of image processing in a computing device comprising an object detection system, the method comprising processing:
   a first image frame;
   a second image frame; and
   one or more further image frames,
   the second image frame having been captured subsequent to the first image frame and the one or more further image frames having been captured subsequent to the second image frame, and wherein the method comprises:
   performing a feature extraction operation on the first image frame and the second image frame;
   performing an object detection operation to produce object detection data, said object detection operation using feature data from said feature extraction operation; and
   modifying at least one parameter of said feature extraction operation for processing said one or more further image frames, in response to a characteristic of said object detection data,
   wherein the characteristic of said object detection data comprises at least one of: (i) an indication that an object, detected in the first and second image frames, has accelerated or decelerated relative to an environment represented in the first and second image frames; (ii) an indication that a change in a position of an object detected in the first and second image frames, relative to an environment represented in the first and second image frames, has a predetermined relationship with a predetermined threshold; and (iii) an indication that a change in a size of an object detected in the first and second image frames, relative to an environment represented in the first and second image frames, has a predetermined relationship with a predetermined threshold.

2. The method according to claim 1, wherein said feature extraction operation, performed on a given image frame, comprises determining feature data corresponding to the given image frame.

3. The method according to claim 2, the feature data comprising one or more histogram of oriented gradients (HOG) descriptors.

4. The method according to claim 3, wherein the at least one parameter of said feature extraction operation comprises at least one of:
   (i) an offset between the given image frame and a plurality of cells into which elements of the given image frame are distributed to determine a histogram of oriented gradients for each of the plurality of cells, the determined histograms of oriented gradients forming the one or more HOG descriptors corresponding to the given image frame;
   (ii) a relative scale between the given image frame and a cell size of a plurality of cells into which pixels of the given image frame are distributed to determine a histogram of oriented gradients for each of the plurality of cells, the determined histograms of oriented gradients forming the one or more HOG descriptors corresponding to the given image frame; and
   (iii) an update rate corresponding to a rate at which subsequent image frames are processed by the feature extraction operation.

5. The method according to claim 4, in accordance with (i), wherein modifying the offset comprises selecting a set of different offsets between the given image frame and the plurality of cells for which the feature extraction operation is performed.

6. The method according to claim 4, in accordance with (ii), wherein modifying the relative scale comprises selecting a set of different relative scales between the given image frame and the plurality of cells for which the feature extraction operation is performed.

7. The method according to claim 6, the method comprising modifying a resolution of an object detection model in accordance with the modifying of the relative scale between the given image frame and the cell size, the resolution corresponding to a portion size of the plurality of cells, wherein the cells are processed using the object detection model in portions having the portion size during the object detection operation.

8. The method according to claim 1, wherein the characteristic of said object detection data comprises an indication of an object being detected in the second image frame, the object not having been detected in the first image frame.

9. The method according to claim 1, wherein the characteristic of said object detection data comprises an indication of an object not being detected in the second image frame, which object having been detected in the first image frame.

10. The method according to claim 1, wherein the modifying comprises modifying at least one parameter of said feature extraction operation to change, in response to the characteristic of the object detection data, an operational precision of the object detection system for processing said one or more further image frames.

11. The method according to claim 1, comprising modifying at least one parameter of said object detection operation for processing said one or more further image frames, in response to a characteristic of said object detection data.

12. The method according to claim 11, wherein modifying the at least one parameter of said object detection operation comprises selecting a set of object detection models implementable as part of said object detection operation, for processing said one or more further image frames, in response to the characteristic of said object detection data.

13. The method according to claim 12, wherein selecting the set of object detection models implementable as part of said object detection operation comprises selecting which object detection models of a plurality of object detection models are implementable based on links between one or more of the plurality of object detection models.

14. An image processing system comprising:
   at least one processor configured to implement an object detection system; and
   storage accessible by the at least one processor, the storage configured to store:
   a first image frame;
   a second image frame; and
   one or more further image frames,
   the second image frame being captured subsequent to the first image frame and the one or more further image frames being captured subsequent to the second image frame;
   wherein the object detection system is configured to:
   perform a feature extraction operation on the first image frame and the second image frame;
   perform an object detection operation to produce object detection data, said object detection operation using feature data from said feature extraction operation;
   wherein the image processing system comprises a controller configured to:

modify at least one parameter of said feature extraction operation for processing said one or more further image frames, in response to a characteristic of said object detection data, wherein the characteristic of said object detection data comprises at least one of: (i) an indication that an object, detected in the first and second image frames, has accelerated or decelerated relative to an environment represented in the first and second image frames; (ii) an indication that a change in a position of an object detected in the first and second image frames, relative to an environment represented in the first and second image frames, has a predetermined relationship with a predetermined threshold; and (iii) an indication that a change in a size of an object detected in the first and second image frames, relative to an environment represented in the first and second image frames, has a predetermined relationship with a predetermined threshold.

15. The image processing system according to claim 14, wherein the object detection system comprises a support vector machine configured to perform the object detection operation.

16. The image processing system according to claim 15, wherein the storage is configured to store a plurality of object detection models, each of the plurality of object detection models being configured to use feature data derived from a given image frame to detect a predetermined object class or instance in the given image frame, wherein the object detection system is configured to use a subset of the plurality of object detection models to perform the object detection operation, and wherein the controller is configured to, in response to the characteristic of said object detection data, modify a number of the object detection models in the subset for processing said one or more further image frames.

17. A method of image processing in a computing device comprising an object detection system, the method comprising processing:

a first image frame;

a second image frame; and one or more further image frames, the second image frame having been captured subsequent to the first image frame and the one or more further image frames having been captured subsequent to the second image frame, and wherein the method comprises:

performing a feature extraction operation on the first image frame and the second image frame;

performing an object detection operation to produce object detection data, said object detection operation using feature data from said feature extraction operation; and modifying at least one parameter of said object detection operation for processing said one or more further image frames, in response to a characteristic of said object detection data, wherein modifying the at least one parameter of said object detection operation comprises selecting a set of object detection models implementable as part of said object detection operation, for processing said one or more further image frames, in response to the characteristic of said object detection data, and wherein selecting the set of object detection models implementable as part of said object detection operation comprises selecting which object detection models of a plurality of object detection models are implementable based on links between one or more of the plurality of object detection models.

* * * * *